United States Patent
Xie et al.

(10) Patent No.: US 11,074,521 B2
(45) Date of Patent: Jul. 27, 2021

(54) CAREER PATH RECOMMENDATION ENGINE

(71) Applicant: Microsoft Technology Licensing, LLC, Redmond, WA (US)

(72) Inventors: Wanyan Xie, Sunnyvale, CA (US); Yue Li, Sunnyvale, CA (US); Eric Weber, Sunnyvale, CA (US); Yanjin Kuang, Foster City, CA (US); Shen Huang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 15/941,280

(22) Filed: Mar. 30, 2018

(65) Prior Publication Data
US 2019/0303798 A1    Oct. 3, 2019

(51) Int. Cl.
*G06N 20/00* (2019.01)
*G06Q 50/00* (2012.01)
*G06Q 10/10* (2012.01)
*G06F 16/28* (2019.01)

(52) U.S. Cl.
CPC .......... *G06N 20/00* (2019.01); *G06F 16/285* (2019.01); *G06Q 10/1053* (2013.01); *G06Q 50/01* (2013.01)

(58) Field of Classification Search
CPC .. G06Q 10/105; G06Q 10/1053; G06Q 50/01; G06N 20/00; G09B 7/00; G09B 19/00
See application file for complete search history.

(56) References Cited

U.S. PATENT DOCUMENTS

| | | | |
|---|---|---|---|
| 2010/0082356 A1* | 4/2010 | Verma | G06Q 10/00 705/1.1 |
| 2012/0226623 A1* | 9/2012 | Jurney | G06Q 50/01 705/321 |
| 2015/0127565 A1* | 5/2015 | Chevalier | G06Q 30/00 705/319 |
| 2015/0317759 A1* | 11/2015 | Jing | G06Q 50/2057 705/328 |
| 2015/0317760 A1* | 11/2015 | Pham | G06Q 50/2057 705/328 |
| 2016/0321613 A1* | 11/2016 | Wang | G06Q 10/1053 |
| 2018/0232751 A1* | 8/2018 | Terhark | G06Q 10/063118 |

* cited by examiner

*Primary Examiner* — Peter R Egloff
(74) *Attorney, Agent, or Firm* — Schwegman Lundberg & Woessner, P.A.

(57) ABSTRACT

In an example embodiment, profile and/or usage data of a social networking service is leveraged to automatically generate potential career paths for users of the social networking service. Additionally, specific recommendations as to actions the users can take to increase their odds of progressing along particular career paths can be determined, and these recommendations can be shared with users. Both recommendations may be performed in a manner that is scalable for personalized service.

20 Claims, 9 Drawing Sheets

CAREER PATH RECOMMENDATION ENGINE

TECHNICAL FIELD

The present disclosure generally relates to technical problems encountered in providing recommendations related to career path. More specifically, the present disclosure relates to the use of a career path recommendation engine.

BACKGROUND

Social networking services are online platforms that people use to build social networks or social relations with other people. Some social networking services are geared towards career progression, and provide a manner for users to essentially provide digital versions of resumes that can be explored by potential employers or other business contacts.

Many careers follow a limited number of potential progressions. For example, a medical doctor almost always will have an undergraduate degree in a scientific field (e.g., Chemistry, Biology, Pre-Med), followed by attendance at an accredited medical school, followed by a residency. Some careers have a larger number of potential progressions, but some common progressions can still be viewed. A computer programmer, for example, might commonly have obtained an undergraduate degree in Computer Science, but not always—some computer programmers are self-taught and can work their way up to programming positions based on success at previous positions or other progressions.

A career path rarely ends when a particular position is reached; there can often be other positions that can be obtained from just about any position. For example, a computer programmer may progress into a product manager, and then progress into a vice president of a technology division, etc., within a company. Likewise, a computer programmer may progress along a different path, such as to a Chief Technology Officer of a startup.

Users may desire to know what potential career paths are available to them based on their current position, level of education, skills, etc. Furthermore, users may desire to know steps they could take to increase the likelihood of being able to pursue the potential career paths. From a technical standpoint, it is challenging for a computer to determine what career paths are available for a person and what active steps the person can take to achieve each path.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
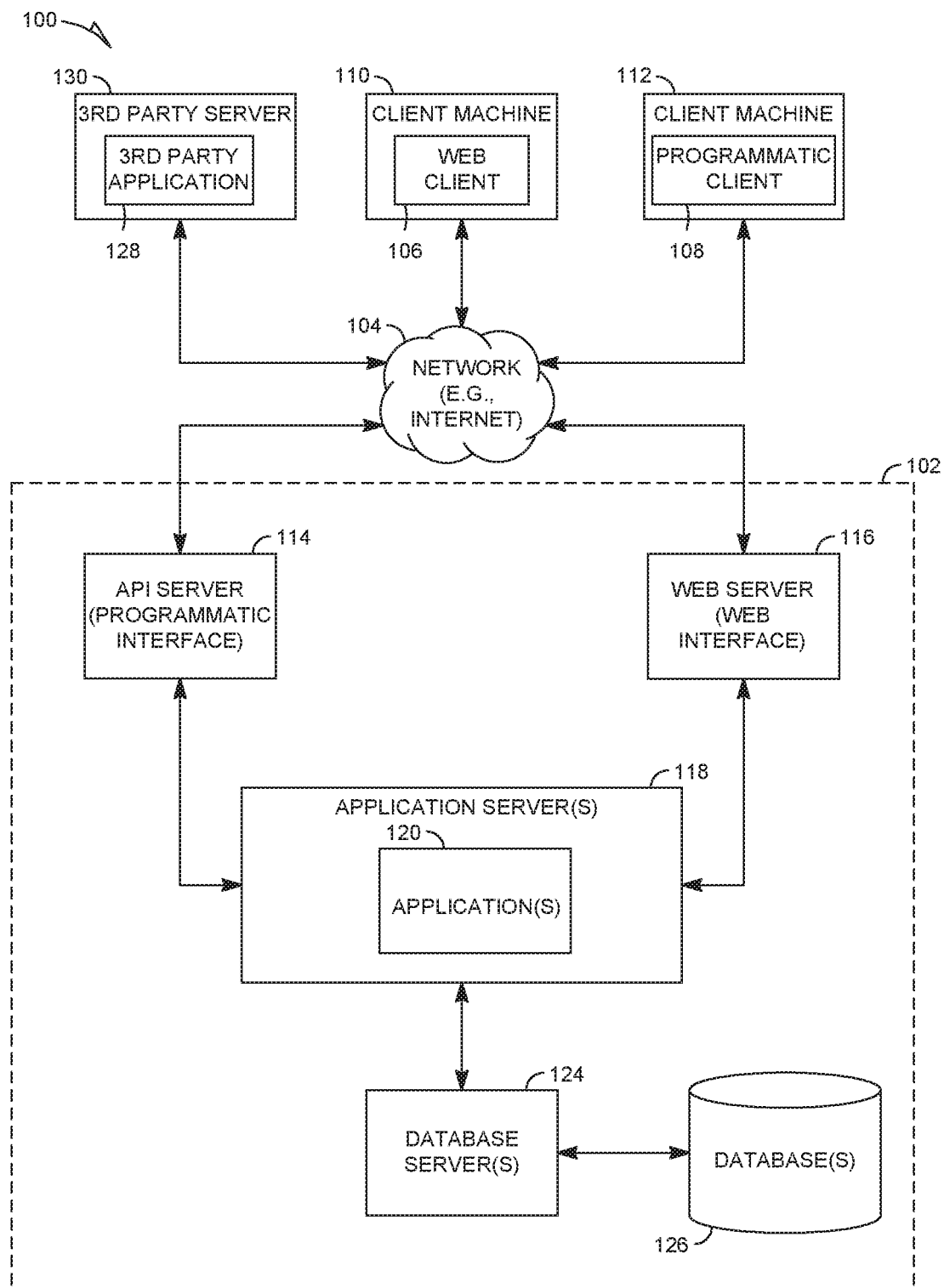
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, profile and/or usage data of a social networking service is leveraged to automatically generate potential career paths for users of the social networking service. Additionally, specific recommendations as to actions the users can take to increase their odds of progressing along particular career paths can be determined, and these recommendations can be shared with users. Both recommendations may be performed in a manner that is scalable for personalized service.

First, profile and/or usage data is examined to locate features relevant to career path determinations. Examples of such features may be, for example, job title, seniority, industry, major, degree, job start date, job send date, years after graduation, etc. In an example embodiment, conditional probability may be applied to estimate the expected time spent at a particular position and the probability of moving to the next position.

In an example embodiment, a first machine learning algorithm may be used to assign weights to features in the profile and/or usage data in a function embodied in a career path model. The career path model is therefore trained by the first machine learning algorithm to receive an input candidate's profile and/or usage data and output a score for one or more potential career paths for the candidate. The score may reflect the probability that the candidate will progress down a particular career path. This training may be performed by feeding training data, including sample profile and/or usage data, into the first machine learning algorithm, the training data having been labeled to identify particular career paths (e.g., academic, corporate, computer-related professional, etc.).

Thus, prior to training the career path model using the first machine learning algorithm and the set of training data, the training data may be analyzed to determine the set of potential career paths. This may include identifying the career paths taken by users in the training data, which can be found by examining the user profiles in the training data. In an example embodiment, a set of tables is then created, with each table corresponding to a different current position, and the entries in each table identifying future positions for the current position based on the profile information in the training data. In some example embodiments, the table for a given first position will contain an entry for a second position if any profile in the training data contained an indication that a particular user went on to obtain the second position after obtaining the first position. Thus, for example, the table for "computer engineer" may contain an entry for "project manager" and "professor" if users in the training data went on to become project managers and professors, but may not contain an entry for "medical doctor" if no computer engineers went on to become medical doctors in the training data. In some example embodiments, only future positions that occurred in the training data more than a threshold number of times will be included in the table. Thus, if, for example, of the 10,000 user profiles in the training set that listed "computer engineer" as a position, there was one user profile that listed a subsequent position as "medical doctor", then "medical doctor" may not be listed as a position in the "computer engineer" table because it did not occur more than a threshold number of times (in this example, the threshold may have been set at 5).

In some example embodiments, each of the subsequent positions listed in a position table may include a count indicating the number of profiles in the training data that listed the subsequent position and also listed the position that corresponds to the position table. Thus, in the above example, if 50 users listed "project manager" as a position in profiles that also listed "computer engineer," then the position table for "computer engineer" may include an entry for "project manager" with a count of 50.

The position tables may then be used to construct a career path graph. The career path graph contains positions as nodes, with edges between nodes being created if there exists an entry for the position corresponding to the node on one side of the edge in the position table corresponding to a position corresponding to the node on the other side of the edge. Thus, for example, a node for "computer engineer" will contain an edge to the node for "project manager," but not an edge to the node for "medical doctor" (assuming the above example where the medical doctor position is not listed in the computer engineer position table). The edge may also be assigned a weight of, or proportional to, the count for the subsequent position in the corresponding position table.

A clustering algorithm may then be applied to this career path graph to identify a set of general career paths. The level of specificity of these career paths may depend on the amount of underlying nodes and edges that are clustered together. For example, there may be very few people who follow an "astronaut" career path, and as such the career path for "astronaut" may be identified generally as "astronaut" and apply to anyone on the career path for becoming an astronaut. In contrast, there may be quite a few people who follow a "medical doctor" career path, and thus clusters within the "medical doctor" career path may identify enough users that the "medical doctor" career path may be split into multiple, more specific, "medical doctor" career paths, such as "medical doctor—endocrinologist", "medical doctor—internal medicine," "medical doctor—oncologist," and so on. The clustering may be one of any number of different clustering algorithms, including, for example, hierarchical clustering algorithms, k-means algorithms, Highly Connected Subgraphs (HCS) clustering algorithm, and neural-based clustering algorithms.

Each of these career paths, no matter the granularity at which they are defined, may be input into the first machine learning algorithm along with the training data in order to learn the weights for the particular career paths. In some respects, therefore, the career path model may actually be thought of as separate career path models, one for each of the identified possible career paths. So, there may be one "astronaut" career path model with one set of weights that have been learned, and a separate "medical doctor—endocrinologist" career path model with a different set of weights that have been learned. This helps reflect the fact that different features may be important in some fields but not in others. For example, number of published papers may be quite an important factor in determining whether a user becomes a professor, but not quite as important a factor in determining whether the user becomes a project manager. As such, the weight assigned to the number of published papers feature in a career path model that includes professor (e.g., academic) may be learned to be higher than the number of published papers feature in a career path model that includes project manager (e.g., corporate computer-related professional). The machine learning algorithm is able to learn these different weights based on the training data and the labels.

It should be noted that the weights may be positive or negative. This helps reflect that some features are important positive predictors of whether a particular position is likely to progress to a future position, whereas other features are important negative predictors of whether a particular position is likely to progress to a future position. For example, attending a community college may be negatively correlated to becoming a college professor.

Each career path model containing a position that a user may have interest in may then be evaluated at runtime to determine the likelihood that the particular career path will be followed by the user. Thus, for example, the profile and/or usage data for a user who is currently a software developer with three years of experience and a Computer Science degree may be submitted to the career path model for "corporate computer-related professional", and the model may evaluate the function by applying the learned weights to one or more features extracted from or derived from the profile and/or usage data for the user. A score may then be calculated for that career path that may be different than a score calculated for a different career path for the same user. For example, a score between 0 and 1 may be assigned, with 1 reflecting the highest probability and 0 the lowest, and in this example a score of 0.55 may be output for this user with respect to the career path including "project manager" and "vice president" (i.e., a corporate computer-related professional career path), whereas a score of 0.12 may be output for this user with respect to the career path including "assistant professor" and "professor" (i.e., an academic career path).

The scores calculated for each potential career path may then be used by a recommendation engine to recommend one or more activities for a user to engage in in order to improve chances of a successful transition to another position in the potential career path. Thus, if, as in the above example, the user who is currently a software developer with three years of experience and a Computer Science degree may indeed want to become a college professor despite the career path model predicting there is only a 12% chance of achieving that goal. Various permutations of changes to the user's profile may be explored and submitted to the academic career path model to identify potential activities to improve the user's chances. For example, the system may try to increase the number of publications in the user's profile and see if the career path score significantly increases. If it does, then suggesting that the user write and publish additional papers to improve their chances of becoming a college professor may be suggested by the recommendation engine. In another example, the system may try to add additional skills (e.g., Java) to identify skills which, if the user possessed them, would increase the likelihood that the user would be able to progress along a given career path. The system may even be linked to a course provider which is able to suggest specific courses to take to increase such skills.

In another example embodiment, the activities explored or suggested may include seeking out mentorship from experienced users in a career path, rather than specific skills to learn. Certain senior users in various career paths may volunteer to be mentors to these more junior users, and thus an appropriate mentor may be identified and suggested to the user based on the career path information and information in the user's profile (as well as the mentor's profile).

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
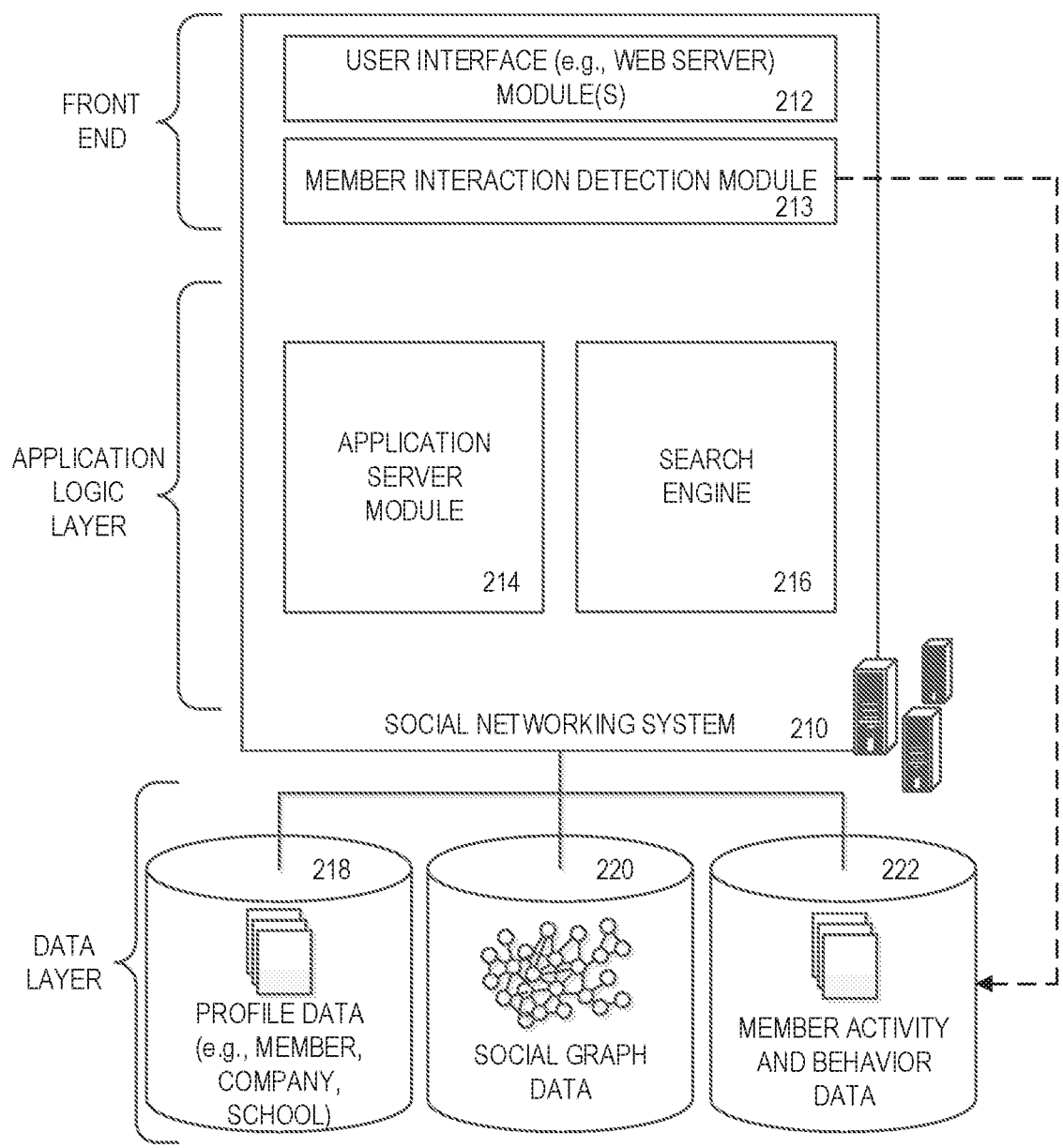
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking system 210 consistent with some embodiments of the present disclosure. In some embodiments, a search engine 216 may reside on the application server(s) 118 shown in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218 or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), and/or member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so forth.

Figure 3:
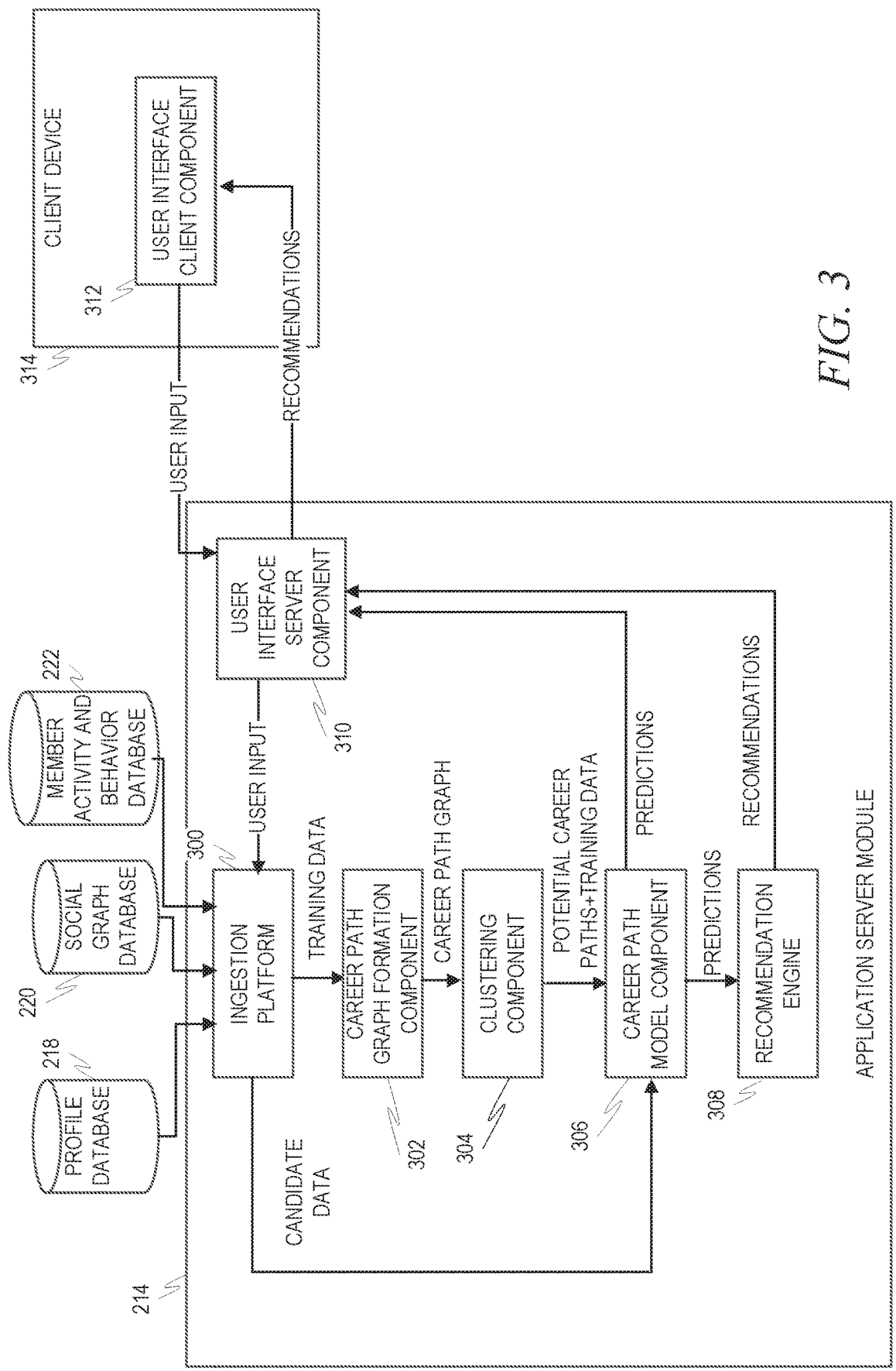
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments, the application server module 214 will contain many sub-components used to perform various different actions within the social networking system 210, in FIG. 3 only those components that are relevant to the present disclosure are depicted.

Here, an ingestion platform 300 obtains information from the profile database 218, the social graph database 220, and/or the member activity and behavior database 222. During a training stage, this information may be the training data used to train the career path models. During a runtime stage, this information may be candidate data about a particular user of interest as indicated by user input.

Referring first to training time, the training data may then be passed to a career path graph formation component 302 that creates a career path graph with positions as nodes and edges between nodes indicating transitions between positions in one or more user profiles in the training data. As described above, in some cases the edges may only exist if the transition count is greater than a predetermined threshold. The career path graph is then sent to a clustering component 304, which then clusters the nodes in the graph to identify a plurality of potential career paths.

The potential career paths are then passed to a career path model component 306 along with the training data. The career path model component 306 trains one or more career path models, which can then provide predictions at runtime based on candidate data. The predictions indicate the likelihood that the corresponding candidate can proceed along the corresponding career path. These predictions may be used by a recommendation engine 308 to recommend one or more activities designed to enhance the candidate's chances of progressing down the corresponding career path. The predictions may also be used directly by a user interface server component 310 to display the predictions themselves, or other information related to the predictions, to a user.

The user interface server component 310 interacts with a user interface client component 312 operating on a client device 314 to generate and operate a graphical user interface in which candidates provide input. This user input may be sent to the ingestion platform 300 at runtime to being the prediction process. Predictions and/or recommendations may be passed to the user interface server component 310 to present those predictions and/or recommendations to the user.

In some example embodiments, the training data and/or candidate data is transmitted in the form of feature vectors. For example, each member profile may have its own feature vector formed of the information in the profile database 218, the social graph database 220, and the member activity and behavior database 222. In other example embodiments, the ingestion platform 300 sends raw information to the career path model component 306, which creates its own feature vectors from the raw information.

Figure 4:
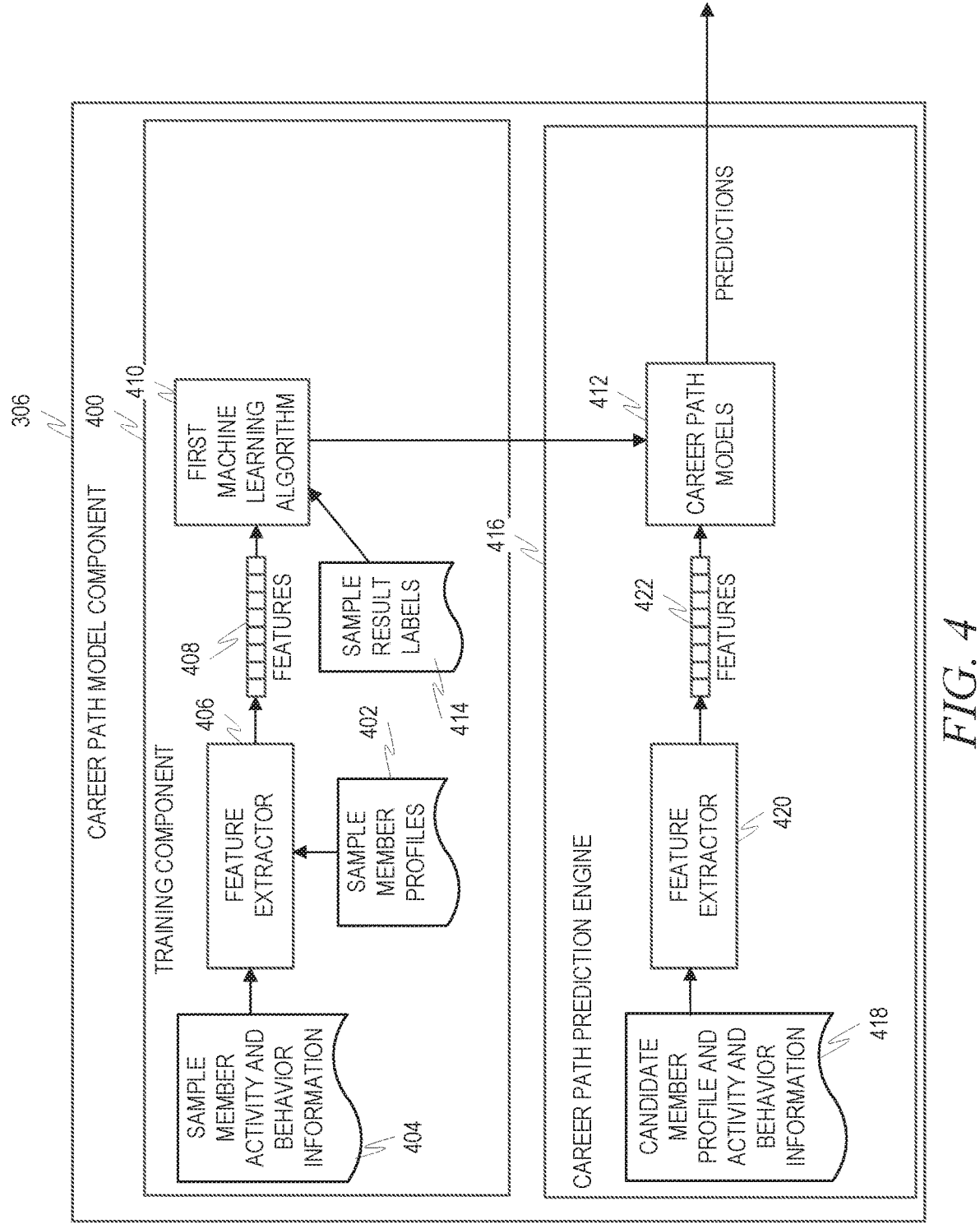
FIG. 4 is a block diagram illustrating the career path model component of FIG. 3 in more detail, in accordance with an example embodiment.

FIG. 4 is a block diagram illustrating the career path model component 306 of FIG. 3 in more detail, in accordance with an example embodiment. In a training component 400, sample member profiles 402, and/or sample member activity and behavior information 404 are input to a feature extractor 406, which acts to extract curated features 408 from the sample member profiles 402 and/or sample member activity and behavior information 404. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and the like. The features 408 are then passed to a first machine learning algorithm 410.

The first machine learning algorithm 410 may be selected from among many different potential supervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

As described above, the first machine learning algorithm 410 may be used to learn weights assigned to features in functions embodied in career path models 412. The career path models 412 are therefore trained by the first machine learning algorithm 410 to receive an input candidate's profile and/or usage data features and output a score for one or more potential career paths for the candidate.

In a career path prediction engine 416, candidate user profiles and sample member and activity and behavior information 418 for a candidate user are input to a feature extractor 420, which acts to extract curated features 422 from the candidate user profiles and sample member and activity and behavior information 418. The curated features 422 are then used as input to the career path models 412, which output scores indicating the likelihood that the candidate user will follow each of the corresponding potential career paths.

The mechanism by which the predictions and/or recommendations are utilized and presented to users by the user interface server component 310 and user interface client component 312 may vary depending on implementation. In one example embodiment, a screen may be presented to a user, via a graphical user interface, displaying potential career paths for the user. Upon selection of one of these potential career paths, the recommendations for the user to increase his or her chances for progressing down the career path may be presented to the user. Other information may be presented to the user either in conjunction with or in lieu of these recommendations. For example, the user may be presented with typical future positions along a selected career path.

In an example embodiment, the information may be presented to the user via an intelligent conversation system. Specifically, the user may be provided with a mechanism to conduct a "chat" with the intelligent conversation system where the intelligent conversation system can detect the user's intention with spoken or written phrases and return appropriate predictions and/or recommendation in response to those intentions. This may be known as a "chatbot."

Figure 5:
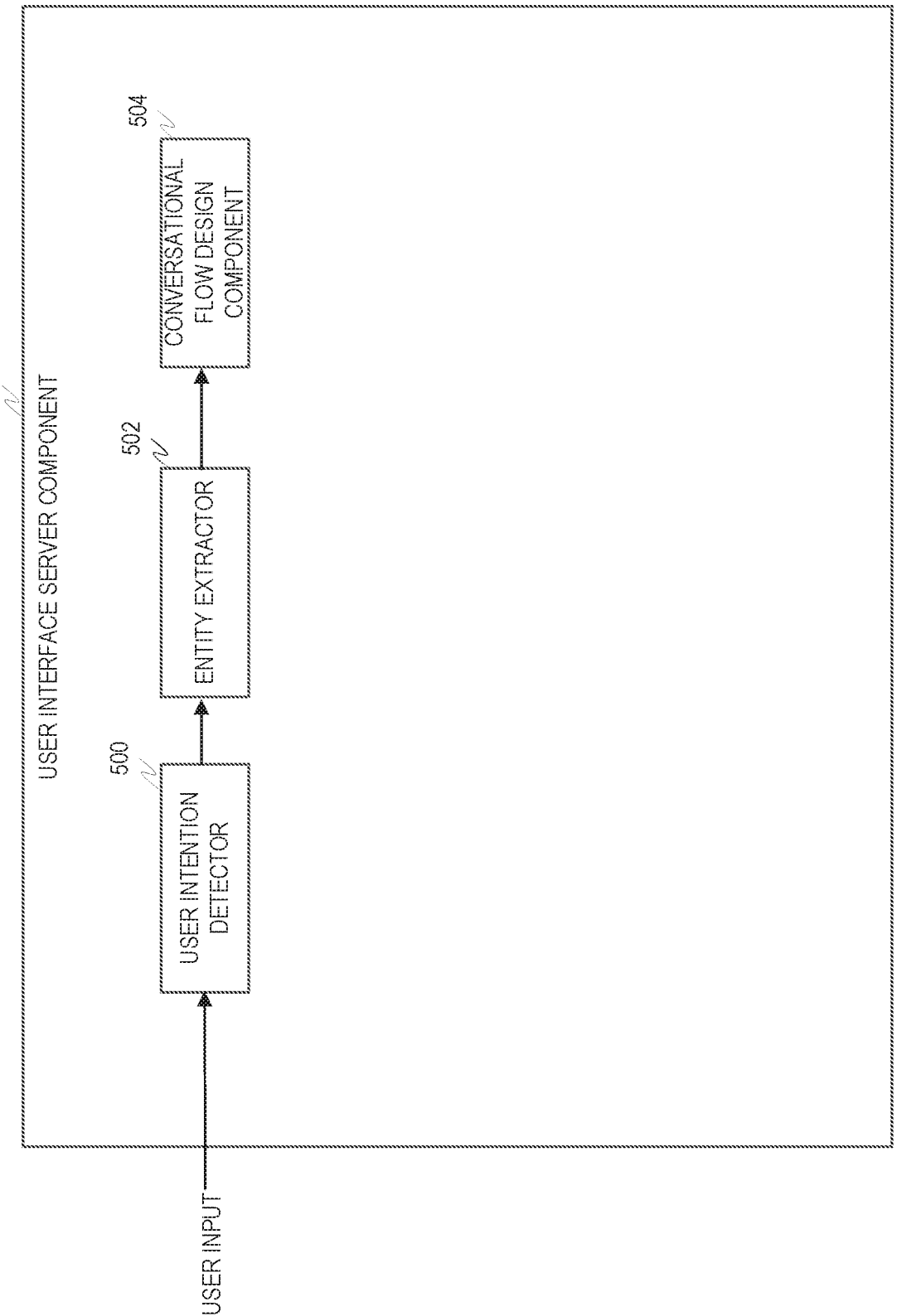
FIG. 5 is a block diagram illustrating a user interface server component of FIG. 3 in more detail, in accordance with an example embodiment.

FIG. 5 is a block diagram illustrating a user interface server component 310 of FIG. 3 in more detail, in accordance with a chatbot embodiment. In the chatbot embodiment, a user intention detector 500 is provided. In this component, the goal is to understand the user's expectation and represent it as a single question. A natural language processing technique may be applied to deduce the meaning of individual terms in the spoken or written text, and the meanings of these individual terms may then be combined to identify the meaning of entire sentences, or even groups of sentences. In an example embodiment, a second machine learning algorithm is used to train a user intention model that identifies the probability that the user means one of a predetermined number of different questions with the spoken or written text. Specifically, publicly available messaging information (or information that is otherwise not private, such as information a user has voluntarily opted-out of privacy detection for), can be used as training data, which can then be labeled and submitted to the second machine learning algorithm to train the model. With the labeled data, the model may be built via a supervised learning approach that will help the user intention detector 500 detect what topic a user wants to talk about.

It should be noted that there may, in fact, be multiple models built using this approach. Indeed, different career paths may have different models for the user intention detection, given that certain terms often have different meanings in different professions. The term "Java", for example, to a computer scientist means a specific object-oriented computer language, whereas "Java" to a coffee barista means coffee. Thus, if a different model is used for computer scientists than coffee baristas, then the system is able to differentiate between the meanings of the same words in different contexts.

An entity extractor 502 can then be used to identify key terms in user input, which helps identify the correct answers to the user's query. These key terms may be viewed as parameters of the topic/question the user is intending to ask, as detected by the user intention detector. For example, if the user says something like, "How can I get promoted to senior data scientist?", the question may be detected as, "How can user A progress along a career path including position B." The B term may then be extracted by the entity extractor 502 from the input data. In this case, B would be "senior data scientist." It should be noted that it is not required that all such parameters be extracted explicitly from the user input containing the question. In some example embodiments, previous user inputs may be parsed to identify such parameters. For example, a user may be asking a series of questions, such as "what do senior data scientists get paid?" followed by "OK, how do I become one?" In this example, the last input does not actually contain the parameter B, but parameter B may be extracted from the earlier input. In some example embodiments, a parameter may be extracted from other sources, such as from previous answers to user questions. For example, the user may ask, "What job can I be promoted to?", to which the system may respond "senior data scientist." The user may follow up with, "OK, how do I become one?" In such cases, the system's previous response may be used as the parameter. Nevertheless, the entity extractor 502 acts to identify key words in user input (or otherwise present in user conversations, such as in user answers). In some example embodiments, the entity extractor 502 may have added intelligence to identify the parameters in other data, such as in user profile (which indicate, for example, such parameters as current position and location).

A conversational flow design component 504 may detect patterns in transitions of conversation via frequent item mining to provide a well-designed conversation.

The above chatbot may be implemented, for example, as part of a voice detection system such as a smart speaker having a microphone. In this manner, the user may simply speak to the smart speaker and receive corresponding responses, without needing to type or otherwise write such input.

Figure 6:
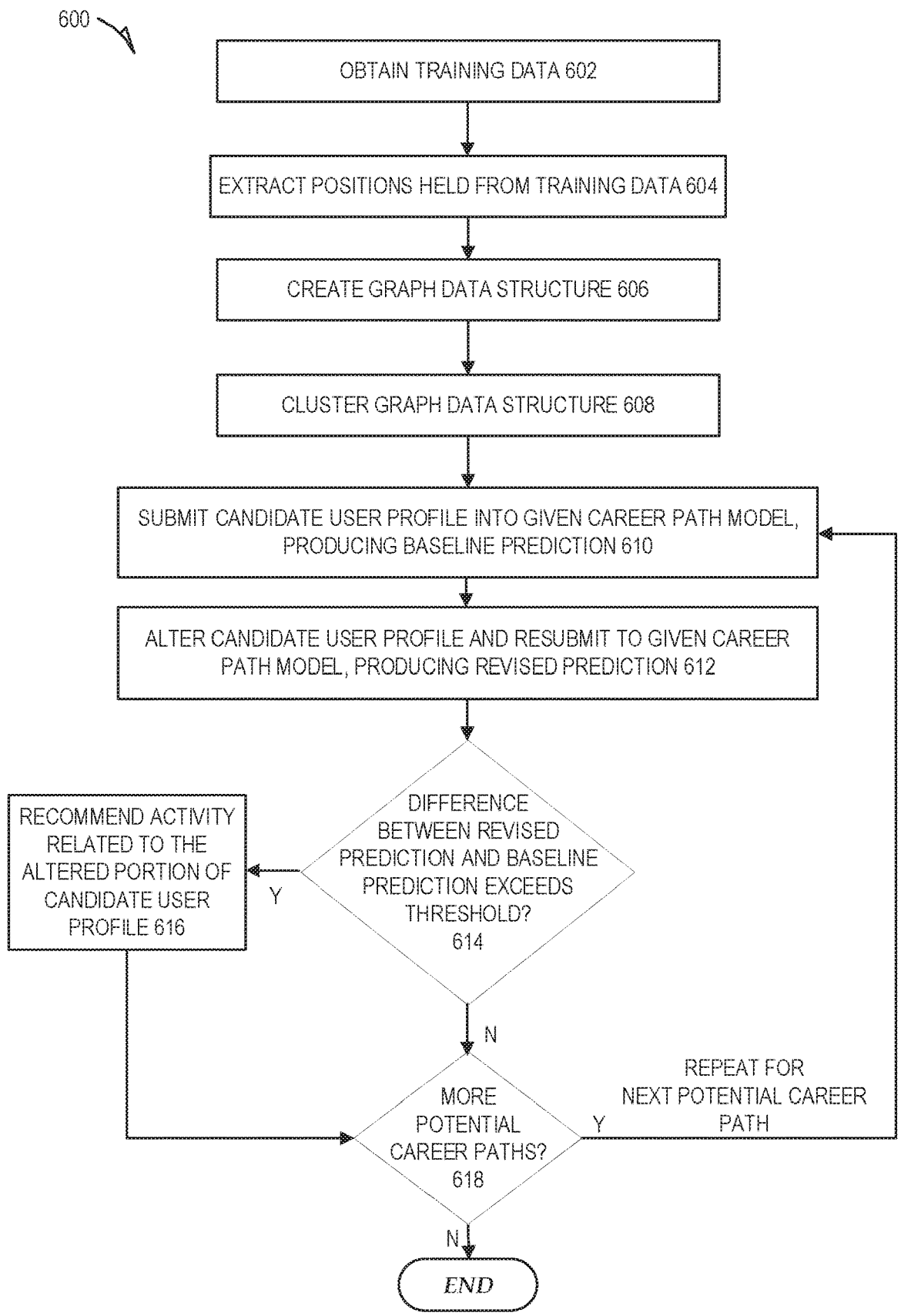
FIG. 6 is a flow diagram illustrating a method for operating a career path recommendation engine, in accordance with an example embodiment.

FIG. 6 is a flow diagram illustrating a method 600 for operating a career path recommendation engine, in accordance with an example embodiment. At operation 602, a set of training data comprising a plurality of social networking service profiles is obtained. At operation 604, one or more positions held current and in the past by social networking service members corresponding to the social networking service profiles is extracted from the plurality of social networking service profiles. In an example embodiment, the extracting includes identifying a cohort of similar member profiles (e.g., same industry, same current position) and then creating a table for the cohort listing, for each member of the cohort, current and previous positions. Table 1 below is an example of such a table.

TABLE 1

| Member_id | Skills | Current position | Current position start time | Previous position | Time spent on this position |
|---|---|---|---|---|---|
| 1 | a, b | A | x | C | y |
| 1 | a, b | A | x | D | z |

At operation 606, a career path graph data structure is created. The career path graph data structure comprises a plurality of nodes and edges between nodes, each node in the career path graph data structure corresponding to a different one of the one or more positions and each edge in the career path data structure indicating that there were n or more occurrences in the training data where the positions represented by the nodes on either side of the edge were contained in the same social networking service profile. In some example embodiments, n is 1, whereas in other example embodiments n is greater than 1.

Figure 7:
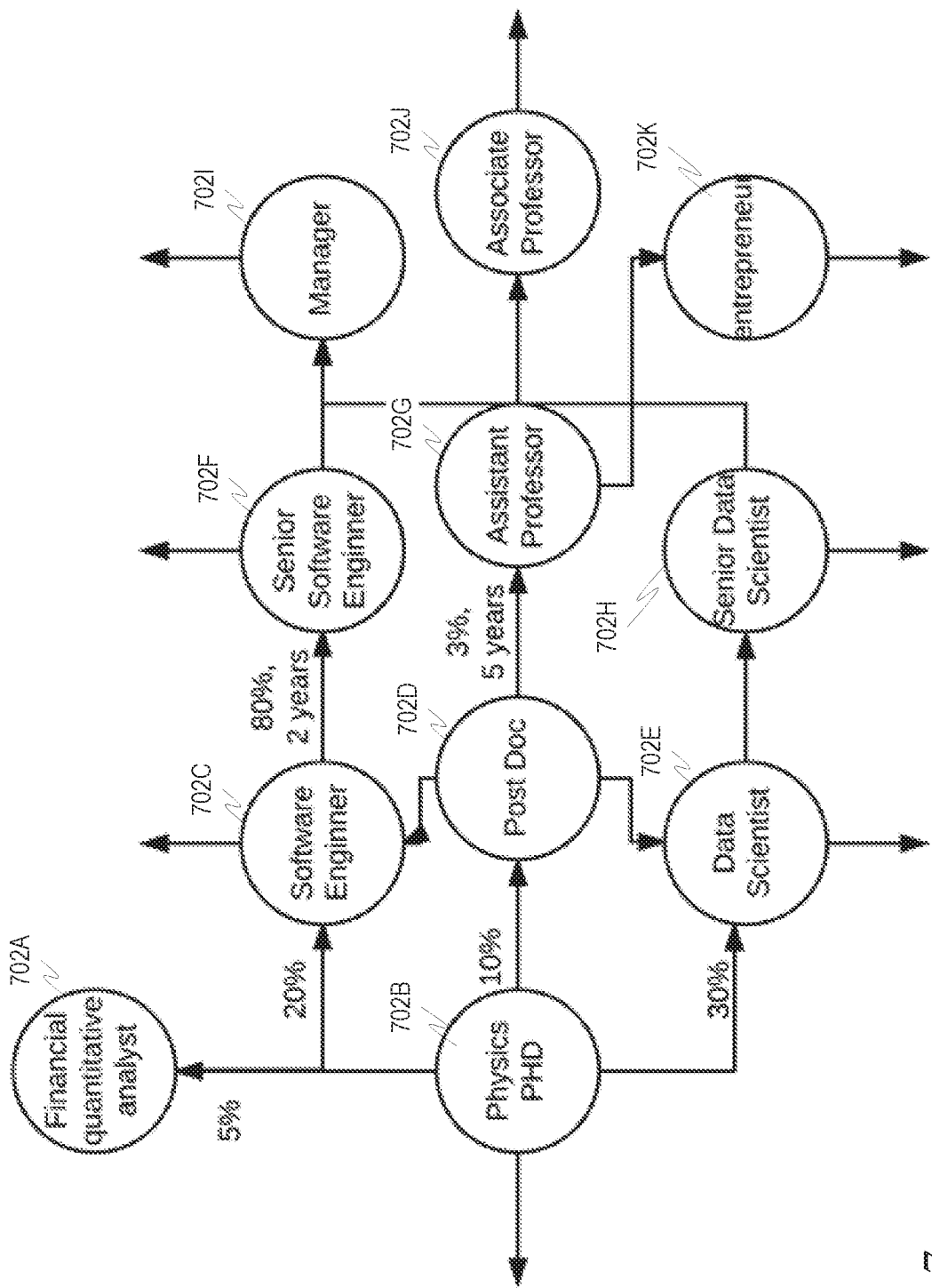
FIG. 7 is a diagram illustrating an example career path graph data structure in accordance with an example embodiment.

FIG. 7 is a diagram illustrating an example career path graph data structure 700 in accordance with an example embodiment. Each node 702A-702K represents a different position in the career path, with edges between the nodes representing transitions between the positions that occurred in the cohort table. The edges may contain additional information about the transition, such as the number of users in the cohort that made the transition, the average time for the transition to occur, and the odds that the transition would have occurred.

At operation 608, the career path graph data structure is clustered using a clustering algorithm, to generate one or more clusters of nodes, each cluster representing a potential career path. Each position in each cluster (career path) may then be assigned a table containing information that may be relevant to a machine learning algorithm in determining likelihood of transition to or from the position. Table 2 below is an example of a position table.

TABLE 2

| Member id | Title | Industry | Size of company | Geolocation | Skill | Time spent on this position |
|---|---|---|---|---|---|---|

A loop is then begun for each potential career path, using a first machine learning algorithm to train weights in a career path model corresponding to the potential career path by submitting the training data and labels assigned to the training data into the first machine learning algorithm. At operation 610, a candidate user profile is submitted into a given career path model, outputting a baseline prediction indicating a likelihood of a user corresponding to the candidate user profile progressing down a career path corresponding to the given career path model. At operation 612, the candidate user profile is altered and the altered candidate user profile is resubmitted to the given career path model to obtain a revised prediction. At operation 614, the revised prediction is compared to the baseline prediction from the given career path model. At operation 616, in response to a determination that the difference between the revised prediction to the baseline prediction exceeds a predetermined threshold, an activity related to the altered portion of the candidate user profile is recommended to the user corresponding to the candidate user profile.

At operation 618, it is determined if there are any additional potential career paths. If so, then the method 600 loops back to operation 610 for the next potential career paths. If no, then the method 600 ends.

Figure 8:
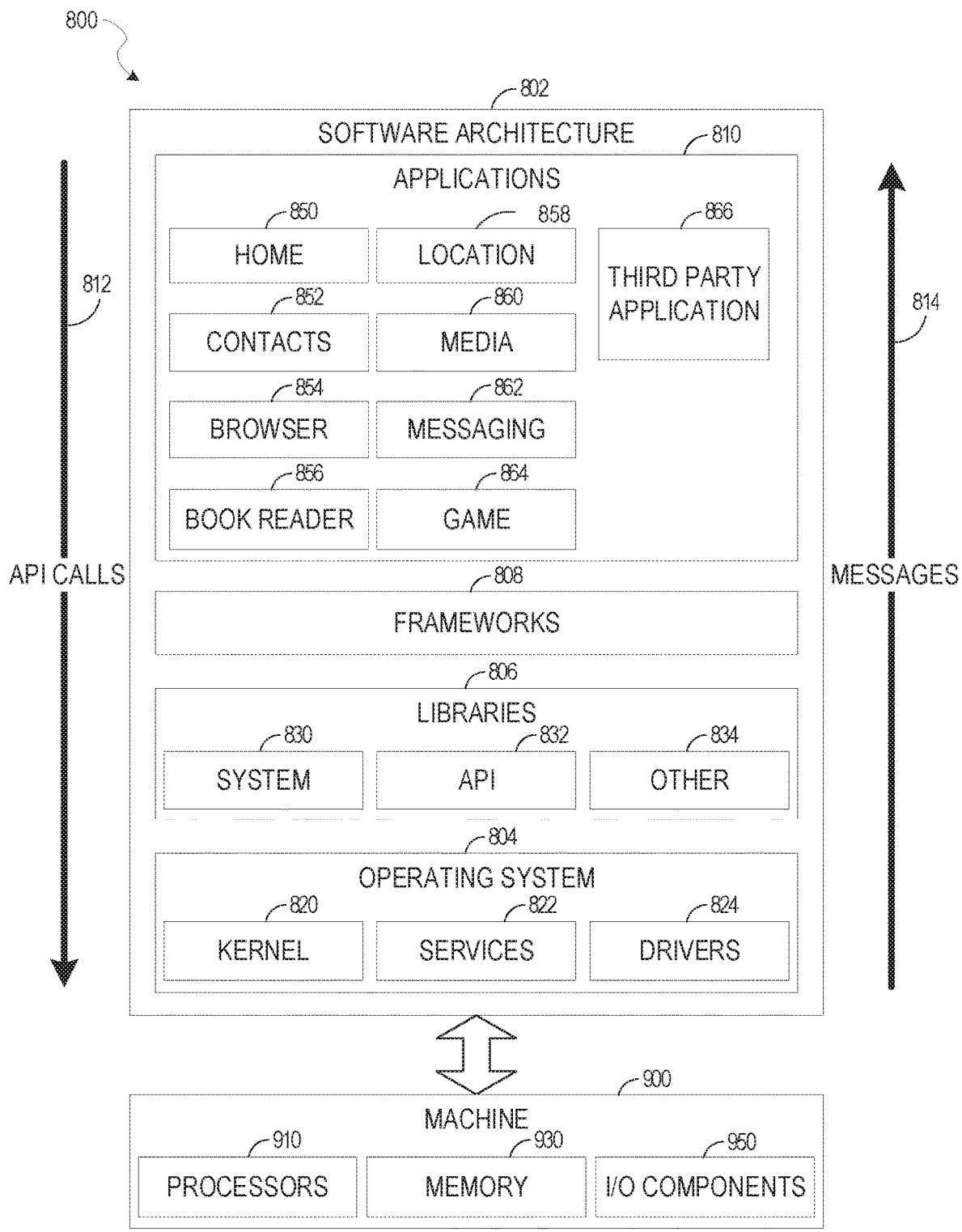
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
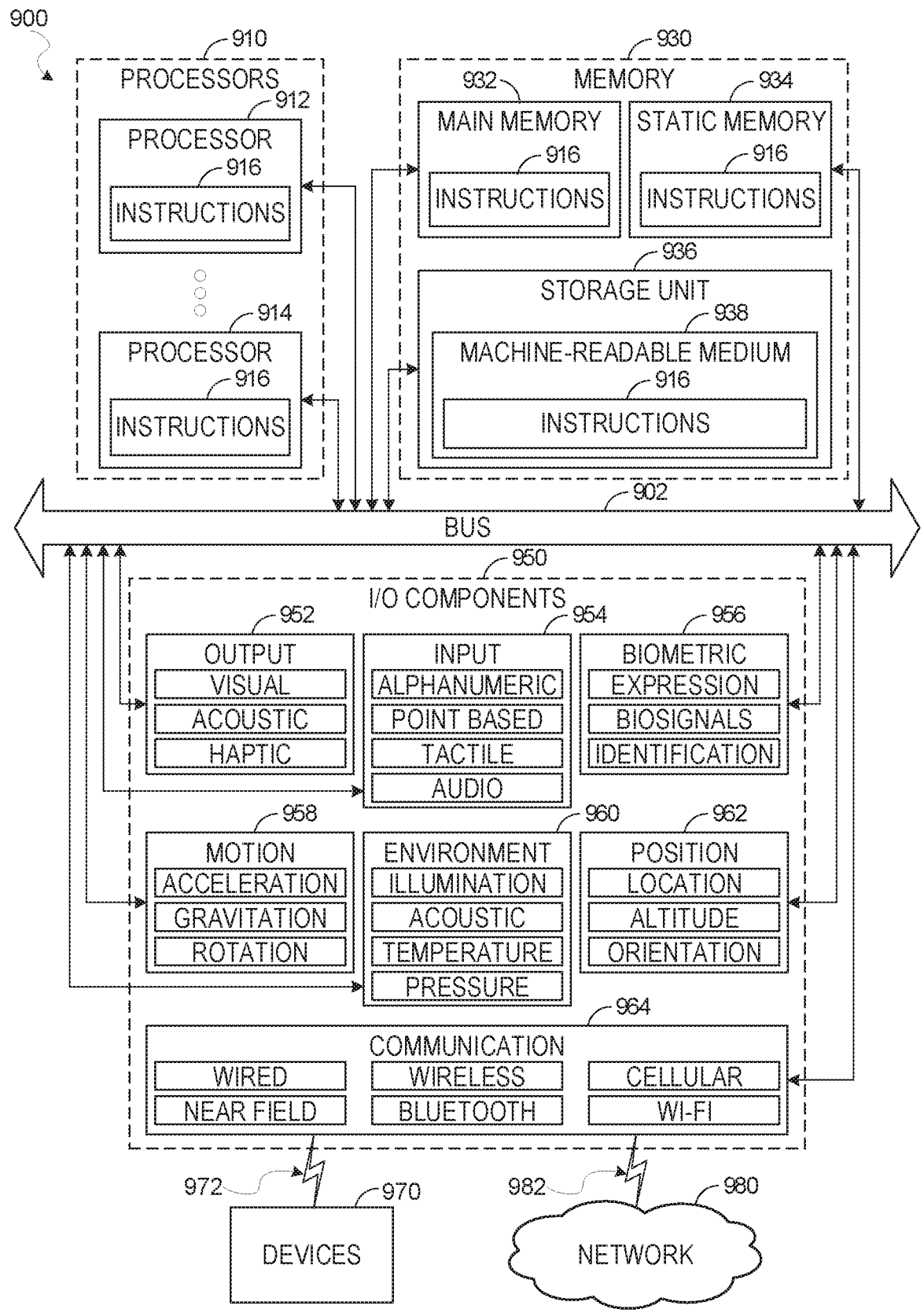
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. For example, the instructions 916 may cause the machine 900 to execute the method 600 of FIG. 6. Additionally, or alternatively, the instructions 916 may implement FIGS. 1-5, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer-readable medium having instructions stored thereon, which, when executed by a processor, cause the system to:
obtain a set of training data comprising a plurality of social networking service profiles;
extract, from the plurality of social networking service profiles, one or more positions held currently and in the past by social networking service members corresponding to the social networking service profiles;
create a career path graph data structure, the career path graph data structure comprising a plurality of nodes and edges between nodes, each node in the career path graph data structure corresponding to a different one of the one or more positions, and each edge in the career path data structure indicating that there were n or more occurrences in the training data where the positions represented by the nodes on either side of the edge were contained in the same social networking service profile;
cluster the career path graph data structure, using a clustering algorithm, to generate one or more clusters of nodes, each cluster representing a potential career path;
for each potential career path, use a first machine learning algorithm to train weights in a career path model corresponding to the potential career path by submitting the training data and labels assigned to the training data into the first machine learning algorithm;
submit a candidate user profile into a given career path model, outputting a baseline prediction indicating a likelihood of a user corresponding to the candidate user profile progressing down a career path corresponding to the given career path model;
alter the candidate user profile and resubmit the altered candidate user profile to the given career path model to obtain a revised prediction;
compare the revised prediction to the baseline prediction from the given career path model; and
in response to a determination that the difference between the revised prediction to the baseline prediction exceeds a predetermined threshold, recommend to the user corresponding to the candidate user profile an activity related to the altered portion of the candidate user profile.

2. The system of claim 1, wherein the training data further comprises user activity and/or behavioral information.

3. The system of claim 1, wherein the weights trained by the first machine learning algorithm are weights assigned to features of the training data.

4. The system of claim 3, wherein one or more of the features are extracted directly from the training data.

5. The system of claim 3, wherein one or more of the features are computed from information extracted from the training data.

6. The system of claim 1, wherein the instructions further cause the system to extract includes forming a set of tables, each table corresponding to a particular position found in a social networking service profile and each entry in the table containing another position found in at least n social networking service profiles along with the particular position.

7. The system of claim 6, wherein each entry in each table further indicates n.

8. A computerized method comprising:
obtaining a set of training data comprising a plurality of social networking service profiles;
extracting, from the plurality of social networking service profiles, one or more positions held currently and in the past by social networking service members corresponding to the social networking service profiles;
creating a career path graph data structure, the career path graph data structure comprising a plurality of nodes and edges between nodes, each node in the career path graph data structure corresponding to a different one of the one or more positions, and each edge in the career path data structure indicating that there were n or more occurrences in the training data where the positions represented by the nodes on either side of the edge were contained in the same social networking service profile;

clustering the career path graph data structure, using a clustering algorithm, to generate one or more clusters of nodes, each cluster representing a potential career path;

for each potential career path, using a first machine learning algorithm to train weights in a career path model corresponding to the potential career path by submitting the training data and labels assigned to the training data into the first machine learning algorithm;

submitting a candidate user profile into a given career path model, outputting a baseline prediction indicating a likelihood of a user corresponding to the candidate user profile progressing down a career path corresponding to the given career path model;

altering the candidate user profile and resubmitting the altered candidate user profile to the given career path model to obtain a revised prediction;

comparing the revised prediction to the baseline prediction from the given career path model; and in response to a determination that the difference between the revised prediction to the baseline prediction exceeds a predetermined threshold, recommending to the user corresponding to the candidate user profile an activity related to the altered portion of the candidate user profile.

9. The computerized method of claim 8, wherein the training data further comprises user activity and/or behavioral information.

10. The computerized method of claim 8, wherein the weights trained by the first machine learning algorithm are weights assigned to features of the training data.

11. The computerized method of claim 10, wherein one or more of the features are extracted directly from the training data.

12. The computerized method of claim 10, wherein one or more of the features are computed from information extracted from the training data.

13. The computerized method of claim 8, further comprising forming a set of tables, each table corresponding to a particular position found in a social networking service profile and each entry in the table containing another position found in at least n social networking service profiles along with the particular position.

14. The computerized method of claim 13, wherein each entry in each table further indicates n.

15. A non-transitory machine-readable storage medium comprising instructions which, when implemented by one or more machines, cause the one or more machines to perform operations comprising:

obtaining a set of training data comprising a plurality of social networking service profiles;

extracting, from the plurality of social networking service profiles, one or more positions held currently and in the past by social networking service members corresponding to the social networking service profiles;

creating a career path graph data structure, the career path graph data structure comprising a plurality of nodes and edges between nodes, each node in the career path graph data structure corresponding to a different one of the one or more positions, and each edge in the career path data structure indicating that there were n or more occurrences in the training data where the positions represented by the nodes on either side of the edge were contained in the same social networking service profile;

clustering the career path graph data structure, using a clustering algorithm, to generate one or more clusters of nodes, each cluster representing a potential career path;

for each potential career path, using a first machine learning algorithm to train weights in a career path model corresponding to the potential career path by submitting the training data and labels assigned to the training data into the first machine learning algorithm;

submitting a candidate user profile into a given career path model, outputting a baseline prediction indicating a likelihood of a user corresponding to the candidate user profile progressing down a career path corresponding to the given career path model;

altering the candidate user profile and resubmitting the altered candidate user profile to the given career path model to obtain a revised prediction;

comparing the revised prediction to the baseline prediction from the given career path model; and in response to a determination that the difference between the revised prediction to the baseline prediction exceeds a predetermined threshold, recommending to the user corresponding to the candidate user profile an activity related to the altered portion of the candidate user profile.

16. The non-transitory machine-readable storage medium of claim 15, wherein the training data further comprises user activity and/or behavioral information.

17. The non-transitory machine-readable storage medium of claim 15, wherein the weights trained by the first machine learning algorithm are weights assigned to features of the training data.

18. The non-transitory machine-readable storage medium of claim 17, wherein one or more of the features are extracted directly from the training data.

19. The non-transitory machine-readable storage medium of claim 17, wherein one or more of the features are computed from information extracted from the training data.

20. The non-transitory machine-readable storage medium of claim 15, wherein the instructions further comprise forming a set of tables, each table corresponding to a particular position found in a social networking service profile and each entry in the table containing another position found in at least n social networking service profiles along with the particular position.

* * * * *